US012509324B2

(12) United States Patent
Depaola et al.

(10) Patent No.: US 12,509,324 B2
(45) Date of Patent: Dec. 30, 2025

(54) AUTO RANGE PROCESS FOR ELEVATOR WIRELESS NODE

(71) Applicant: OTIS ELEVATOR COMPANY, Farmington, CT (US)

(72) Inventors: Peter Depaola, Glastonbury, CT (US); Wade A. Montague, Southington, CT (US); Dennis Hanvey, Leonardo, NJ (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1076 days.

(21) Appl. No.: 17/490,497

(22) Filed: Sep. 30, 2021

(65) Prior Publication Data

US 2023/0108212 A1  Apr. 6, 2023

(51) Int. Cl.
*B66B 1/34* (2006.01)
*B66B 1/30* (2006.01)
(Continued)

(52) U.S. Cl.
CPC ............ *B66B 1/3461* (2013.01); *B66B 1/30* (2013.01); *B66B 11/001* (2013.01); *H04B 17/318* (2015.01)

(58) Field of Classification Search
CPC ....... B66B 1/3461; B66B 1/30; B66B 11/001; H04B 17/318
(Continued)

(56) References Cited

U.S. PATENT DOCUMENTS 8,290,527 B2  10/2012 Richardson
8,422,401 B1   4/2013 Choong
(Continued)

FOREIGN PATENT DOCUMENTS

CN  104603040 A  5/2015
CN  107196921 B  4/2020
(Continued)

OTHER PUBLICATIONS

Chinese Office Action for Application No. 202210694087.1, Issued Feb. 18, 2025, 13 Pages.
(Continued)

*Primary Examiner* — Erick D Glass
(74) *Attorney, Agent, or Firm* — CANTOR COLBURN LLP

(57) ABSTRACT

A method of calibrating a beacon for an elevator call system including: determining when a calibrator mobile device is located at a desired distance away from the beacon on a specific landing, the beacon being associated with one or more specific elevator systems at a specific elevator bank on the specific landing; detecting a wireless signal emitted by the beacon using a communication device of the calibrator mobile device when the calibrator mobile device is located at the desired distance; and establishing the desired distance as a selected range of the beacon for locating a passenger device for an elevator call received from the passenger device. The elevator call system is configured to assign future elevator calls received from the passenger mobile device detected to be within the selected range of the beacon to the one or more specific elevator systems at the specific elevator bank on the specific landing.

19 Claims, 4 Drawing Sheets

(51) Int. Cl.
*B66B 11/00* (2006.01)
*H04B 17/318* (2015.01)

(58) Field of Classification Search
USPC .......................................................... 187/247
See application file for complete search history.

(56) References Cited

U.S. PATENT DOCUMENTS

| | | | |
|---|---|---|---|
| 8,660,121 | B2 | 2/2014 | McCormack |
| 8,909,279 | B2 | 12/2014 | Yavuz et al. |
| 9,198,204 | B2 | 11/2015 | Matthews et al. |
| 9,503,906 | B2 | 11/2016 | Dewey et al. |
| 9,602,301 | B2 | 3/2017 | Averitt |
| 9,661,592 | B2 | 5/2017 | Seol et al. |
| 9,699,270 | B2 | 7/2017 | Kande et al. |
| 10,343,874 | B2 | 7/2019 | Scoville et al. |
| 10,589,961 | B2 | 3/2020 | Yang et al. |
| 10,849,134 | B2 | 11/2020 | Islam et al. |
| 10,917,846 | B2 | 2/2021 | Snyder et al. |
| 11,095,502 | B2 | 8/2021 | Gesch et al. |
| 2017/0010099 | A1 | 1/2017 | Simcik |
| 2017/0134894 | A1 | 5/2017 | Simcik |
| 2018/0273344 | A1 | 9/2018 | Mason et al. |
| 2019/0023528 | A1 | 1/2019 | Franco et al. |
| 2019/0185292 | A1 | 6/2019 | Yang et al. |
| 2019/0202657 | A1 | 7/2019 | Li et al. |
| 2019/0389690 | A1 | 12/2019 | Pahlke et al. |
| 2020/0239275 | A1 | 7/2020 | Ladi et al. |
| 2020/0239277 | A1* | 7/2020 | Larmuseau ............ H04W 4/024 |
| 2021/0112425 | A1* | 4/2021 | Tran ..................... H04B 7/0695 |
| 2023/0166944 | A1* | 6/2023 | Depaola .................. B66B 1/468 187/388 |
| 2023/0339723 | A1* | 10/2023 | Depaola .................. B66B 1/468 |

FOREIGN PATENT DOCUMENTS

| | | |
|---|---|---|
| EP | 3305705 A1 | 4/2018 |
| JP | 2020104953 A | 7/2020 |
| KR | 101081215 B1 | 11/2011 |
| WO | 2020136049 A1 | 7/2020 |
| WO | 2021052390 A1 | 3/2021 |

OTHER PUBLICATIONS

Chinese Office Action for Application No. 202210694087.1, Issued Jan. 7, 2025, 13 Pages.

* cited by examiner

AUTO RANGE PROCESS FOR ELEVATOR WIRELESS NODE

BACKGROUND

The subject matter disclosed herein relates generally to the field of elevator systems, and specifically to a method and apparatus for generating elevator calls for elevator systems.

Elevator systems are typically only able to generate an elevator call based on an individual manually entering an elevator call on an elevator call button in a wall next to an elevator bank.

BRIEF SUMMARY

According to an embodiment, a method of calibrating a beacon for an elevator call system is provided. The method including: determining when a calibrator mobile device is located at a desired distance away from the beacon on a specific landing, the beacon being associated with one or more specific elevator systems at a specific elevator bank on the specific landing: detecting a wireless signal emitted by the beacon using a communication device of the calibrator mobile device when the calibrator mobile device is located at the desired distance; and establishing the desired distance as a selected range of the beacon for locating a passenger device for an elevator call received from the passenger device, wherein the elevator call system is configured to assign future elevator calls received from the passenger mobile device detected to be within the selected range of the beacon to the one or more specific elevator systems at the specific elevator bank on the specific landing.

In addition to one or more of the features described herein, or as an alternative, further embodiments may include that prior to determining when the calibrator mobile device is located at the desired distance away from the beacon on the specific landing, the method further include: instructing a calibrator to place the calibrator mobile device at the desired distance away from the beacon.

In addition to one or more of the features described herein, or as an alternative, further embodiments may include that the establishing the desired distance as the selected range of the beacon for locating the passenger device for the elevator call received from the passenger device further includes: adjusting a power of the wireless signal emitted by the beacon such that: the wireless signal is configured to not travel beyond the desired distance: or the wireless signal will be undetectable beyond the desired distance.

In addition to one or more of the features described herein, or as an alternative, further embodiments may include that the establishing the desired distance as the selected range of the beacon for locating the passenger device for the elevator call received from the passenger device further includes: detecting, using the communication device of the calibrator mobile device, a received signal strength indicator of the wireless signal emitted by the beacon; and establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

In addition to one or more of the features described herein, or as an alternative, further embodiments may include: transmitting an elevator call from an elevator call application on the passenger mobile device: detecting the wireless signal emitted by the beacon using a communication device of the passenger mobile device; and assigning the elevator call to the one or more specific elevator systems.

In addition to one or more of the features described herein, or as an alternative, further embodiments may include: moving an elevator car of the one or more specific elevator systems at the specific elevator bank to the specific landing to pick-up a passenger in possession of the passenger mobile device.

In addition to one or more of the features described herein, or as an alternative, further embodiments may include placing the calibrator mobile device at the desired distance away from the beacon on the specific landing.

According to another embodiment, a beacon calibration system for calibrating a beacon of an elevator call system is provided. The beacon calibration system including: a processor; and a memory including computer-executable instructions that, when executed by the processor, cause the processor to perform operations, the operations including: determining when a calibrator mobile device is located at a desired distance away from the beacon on a specific landing, the beacon being associated with one or more specific elevator systems at a specific elevator bank on the specific landing: detecting a wireless signal emitted by the beacon using a communication device of the calibrator mobile device when the calibrator mobile device is located at the desired distance; and establishing the desired distance as a selected range of the beacon for locating a passenger device for an elevator call received from the passenger device, wherein an elevator call system is configured to assign future elevator calls received from the passenger mobile device detected to be within the selected range of the beacon to the one or more specific elevator systems at the specific elevator bank on the specific landing.

In addition to one or more of the features described herein, or as an alternative, further embodiments may include that prior to determining when the calibrator mobile device is located at the desired distance away from the beacon on the specific landing, the operations further include: instructing a calibrator to place the calibrator mobile device at the desired distance away from the beacon.

In addition to one or more of the features described herein, or as an alternative, further embodiments may include that the establishing the desired distance as the selected range of the beacon for locating the passenger device for the elevator call received from the passenger device further includes: adjusting a power of the wireless signal emitted by the beacon such that: the wireless signal is configured to not travel beyond the desired distance: or the wireless signal will be undetectable beyond the desired distance.

In addition to one or more of the features described herein, or as an alternative, further embodiments may include that the establishing the desired distance as the selected range of the beacon for locating the passenger device for the elevator call received from the passenger device further includes: detecting, using the communication device of the calibrator mobile device, a received signal strength indicator of the wireless signal emitted by the beacon; and establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

In addition to one or more of the features described herein, or as an alternative, further embodiments may include that the operations further include: transmitting an elevator call from an elevator call application on the passenger mobile device; detecting the wireless signal emitted by the beacon using a communication device of the passenger mobile device; and assigning the elevator call to the one or more specific elevator systems.

In addition to one or more of the features described herein, or as an alternative, further embodiments may include that the operations further include: moving an elevator car of the one or more specific elevator systems at the specific elevator bank to the specific landing to pick-up a passenger in possession of the passenger mobile device.

According to another embodiment, a computer program product embodied on a non-transitory computer readable medium is provided. The computer program product including instructions that, when executed by a processor, cause the processor to perform operations including: determining when a calibrator mobile device is located at a desired distance away from a beacon on a specific landing, the beacon being associated with one or more specific elevator systems at a specific elevator bank on the specific landing; detecting a wireless signal emitted by the beacon using a communication device of the calibrator mobile device when the calibrator mobile device is located at the desired distance; and establishing the desired distance as a selected range of the beacon for locating a passenger device for an elevator call received from the passenger device, wherein an elevator call system is configured to assign future elevator calls received from the passenger mobile device detected to be within the selected range of the beacon to the one or more specific elevator systems at the specific elevator bank on the specific landing.

In addition to one or more of the features described herein, or as an alternative, further embodiments may include that prior to determining when the calibrator mobile device is located at the desired distance away from the beacon on the specific landing, the operations further include: instructing a calibrator to place the calibrator mobile device at the desired distance away from the beacon.

In addition to one or more of the features described herein, or as an alternative, further embodiments may include that the establishing the desired distance as the selected range of the beacon for locating the passenger device for the elevator call received from the passenger device further includes: adjusting a power of the wireless signal emitted by the beacon such that: the wireless signal is configured to not travel beyond the desired distance; or the wireless signal will be undetectable beyond the desired distance.

In addition to one or more of the features described herein, or as an alternative, further embodiments may include that the establishing the desired distance as the selected range of the beacon for locating the passenger device for the elevator call received from the passenger device further includes: detecting, using the communication device of the calibrator mobile device, a received signal strength indicator of the wireless signal emitted by the beacon; and establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

In addition to one or more of the features described herein, or as an alternative, further embodiments may include that the operations further include: transmitting an elevator call from an elevator call application on the passenger mobile device; detecting the wireless signal emitted by the beacon using a communication device of the passenger mobile device; and assigning the elevator call to the one or more specific elevator systems.

In addition to one or more of the features described herein, or as an alternative, further embodiments may include that the operations further include moving an elevator car of the one or more specific elevator systems at the specific elevator bank to the specific landing to pick-up a passenger in possession of the passenger mobile device.

Technical effects of embodiments of the present disclosure include automatically calibrating the range of beacon (i.e., wireless node) for an elevator call system using a calibration application installed on a calibrator mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Elevator systems are typically only able to generate an elevator call based on an individual manually entering an elevator call using a call button on a wall next to an elevator bank. Elevator calls may now be made through applications of mobile devices. The elevators calls may be made automatically by the application or entered manually into the application by an individual. When the elevator call is placed, a dispatcher of the elevator system would need to know where the individual is located in order to send an elevator car to pick up the individual. For example, the dispatcher would need to know what floor (i.e., landing) the individual is on and which elevator bank the individual is near in order to assign an elevator car of the correct elevator bank and send said elevator car to the correct landing. Previously, the elevator call buttons where on the wall next to the elevator bank and thus this was not an issue, but now with the ability to place elevator calls through mobile devices, knowing where to send elevator cars to pick-up passengers becomes more challenging. The embodiments disclosed herein relate to a system and a method of configuring an elevator call system that uses beacons (i.e., wireless nodes) to properly locate an individual that has entered an elevator call and determine what elevator bank they will utilize and on what landing they will board the elevator system.

Figure 1:
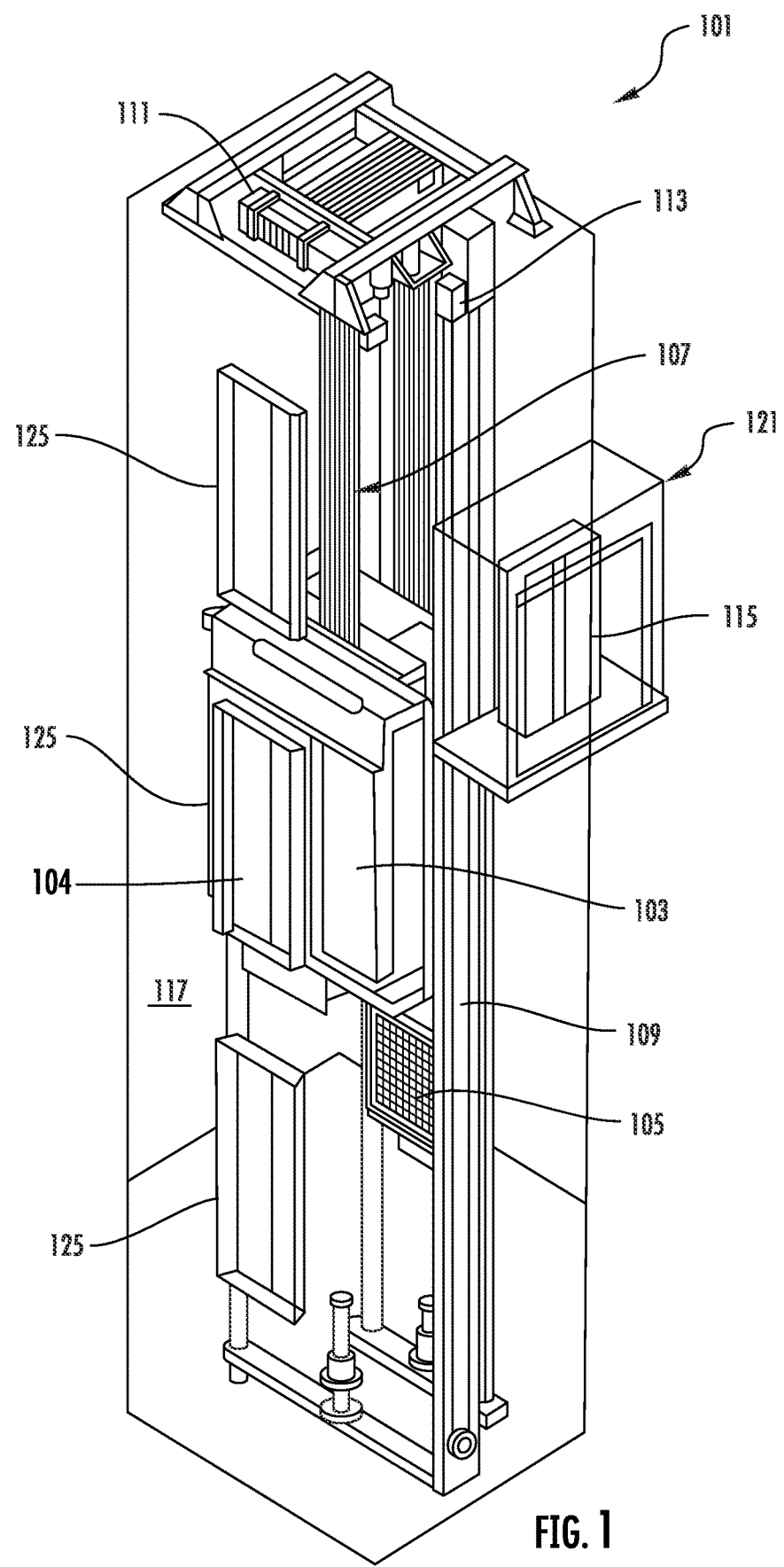
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor or pinched wheel propulsion to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103. There may also be an elevator door 104 located on a landing 125 of the elevator system 101 (see FIG. 2).

Figure 2:
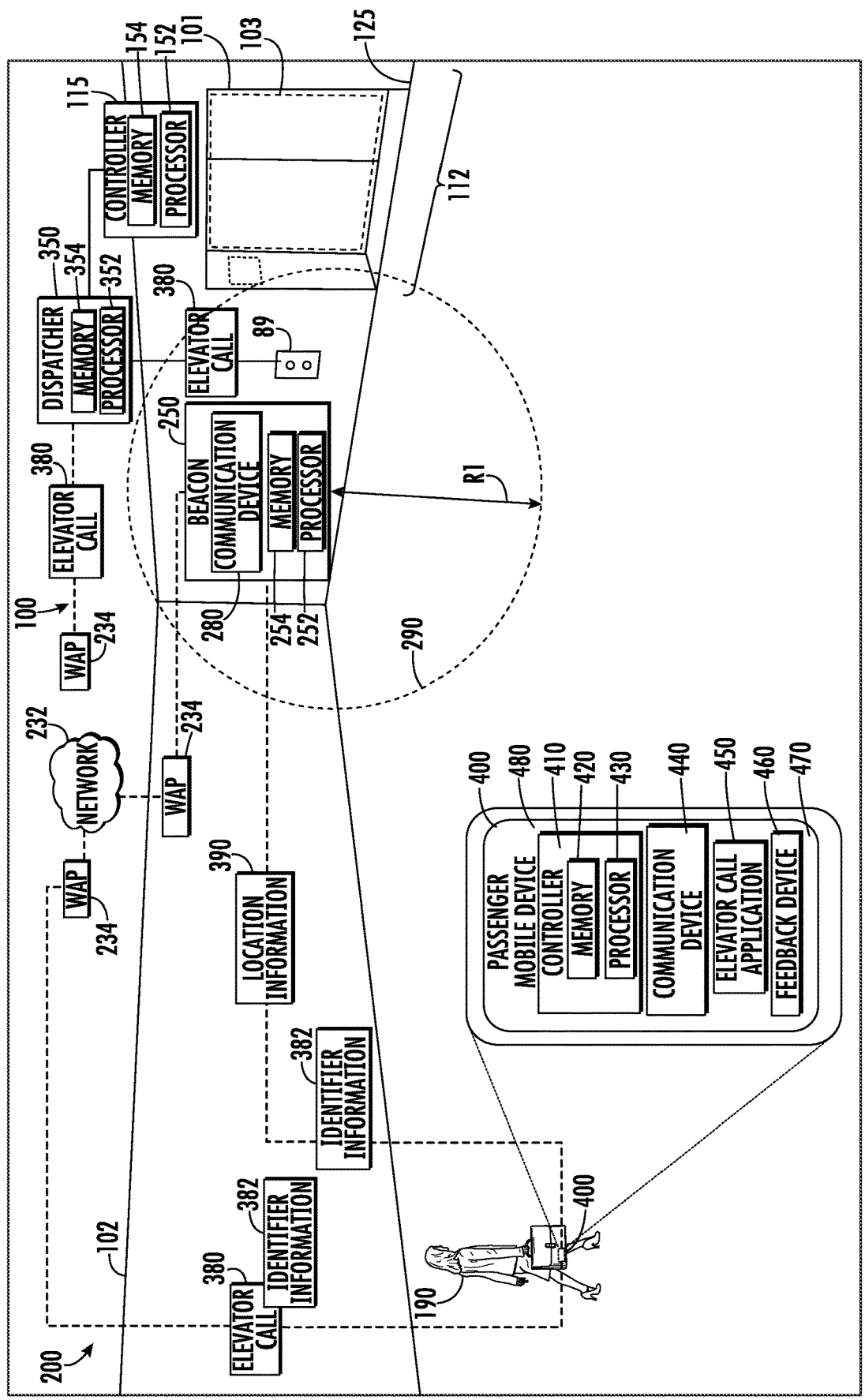
FIG. 2 illustrates a schematic view of an elevator call system used to generate elevator calls based on a detected location of a passenger mobile device in relation to a beacon, in accordance with an embodiment of the disclosure.

Referring now to FIG. 2, with continued reference to FIG. 1, an elevator call system 200 is illustrated, in accordance with an embodiment of the present disclosure. It should be appreciated that, although particular systems are separately defined in the schematic block diagrams, each or any of the systems may be otherwise combined or separated via hardware and/or software.

The elevator call system 200 includes and/or is in wired or wireless communication with one or more beacons 250 (i.e., wireless nodes). It is understood that one beacon 250 is illustrated, the embodiments disclosed herein may be applicable to an elevator call system 200 having one or more beacons 250. The beacon 250 may be configured to act as an extension of the building elevator system 100 by collecting data for the building elevator system 101 and transmitting elevator data to a dispatcher 350 of the building elevator system 100. The beacon 250 is configured to emit a wireless signal 290 detectable by a passenger mobile device 400 of passenger 190 in order to determine a location of the passenger 190. The wireless signal 290 may include location information 390 that helps identify where the beacon 250 is located and thus where the passenger 190 is located. The location information 390 may be readily understandable by an elevator call application 450 on the passenger mobile device 400. Alternatively, the location information 390 may be readily translatable by the elevator call application 450 or the network 232. For example, the location information 390 may be a data string that the elevator call application 450 translates or sends to the network 232 to translate into understandable location information. The location of the passenger 190 will help the dispatcher 350 determine what elevator bank 112 to utilize and what landing 125 to send the elevator car 103.

As illustrated in FIG. 2, a building elevator system 100 within a building 102 may include one or more individual elevator systems 101 organized in elevator banks 112 on a landings 125 (i.e., floor of the building 102). It is understood that while a single elevator system 101 is illustrated in a single elevator bank 112, the elevator bank 112 may comprise any number of elevator systems 101 and there may be one or more elevator banks 112. The elevator system 101 illustrated in FIG. 2 may be a single deck elevator system (e.g., one elevator car) or a double-deck elevator system. The elevator system 101 of FIG. 2 includes an elevator car 103. The elevator car 103 may serve any number of landings 125.

The landing 125 in the building 102 of FIG. 2 may have an elevator call device 89 located proximate the elevator system 101. The elevator call device 89 is configured to transmit an elevator call 380 to a dispatcher 350 of the building elevator system 100. It should be appreciated that, although the dispatcher 350 is separately defined in the schematic block diagrams, the dispatcher 350 may be combined via hardware and/or software in the controller 115 or any other device. The elevator call 380 may include the source of the elevator call 380. The elevator call device 89 may include a destination entry option that includes the destination of the elevator call 380. The elevator call device 89 may be a push button and/or a touch screen and may be activated manually or automatically. For example, the elevator call 380 may be sent by the passenger 190.

A passenger mobile device 400 is configured to transmit an elevator call 380 and the passenger 190 may be in possession of said passenger mobile device 400 to transmit the elevator call 380. The passenger mobile device 400 may belong to the passenger 190, such as, for example, a passenger or potential passenger of the elevator system 101. The passenger 190 may utilize an elevator call application 450 through a passenger mobile device 400 to make an elevator call 380 or an elevator call 380 may be made automatically by the elevator call application 450. The elevator call 380 sent from the elevator call application 450 may include identifier information 382 that indicates what passenger mobile device 400 and/or passenger 190 has transmitted the elevator call 380. The elevator call application 450 may be installed on the passenger mobile device 400 or accessed via the network 232, internet, or some other known portal through the passenger mobile device 400, such as, for example a software-as-a service.

The passenger mobile device 400 may be a mobile computing device that is typically carried by a person, such as, for example a phone, a smart phone, a PDA, a smart watch, a tablet, a laptop, or any other mobile computing device known to one of skill in the art. In an embodiment, the passenger mobile device 400 is a smart phone.

The passenger mobile device 400 includes a controller 410 configured to control operations of the passenger mobile device 400. The controller 410 may be an electronic controller including a processor 430 and an associated memory 420 comprising computer-executable instructions (i.e., computer program product) that, when executed by the processor 430, cause the processor 430 to perform various operations. The processor 430 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 420 may be but is not limited to a random access memory (RAM), read only memory (ROM), or other electronic, optical, magnetic or any other computer readable medium.

The passenger mobile device 400 includes a communication device 440 configured to communicate with the WAP 234 or a beacon 280 through one or more wireless signals. The one or more wireless signals may include Bluetooth, BLE, Wi-Fi, HaLow (801.11ah), zWave, ZigBee, ultra-wideband, Wireless M-Bus, cellular, or any other short-range wireless protocol known to one of skill in the art.

The passenger mobile device 400 may include a display device 480, such as for example a computer display, an LCD display, an LED display, an OLED display, a touchscreen of a smart phone, or any other similar display device known to one of the skill in the art. The passenger 190 operating the passenger mobile device 400 is able to view the elevator call application 450 through the display device 480.

The passenger mobile device 400 includes an input device 470 configured to receive a manual input from the passenger 190 (e.g., human being) of mobile device 400. The input device 470 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the passenger mobile device 400, or any similar input device known to one of skill in the art. The passenger 190 operating the passenger mobile device 400 is able to enter feedback into the elevator call application 450 through the input device 470. The input device 470 allows the passenger 190 operating the passenger mobile device 400 to enter feedback into the elevator call application 450 via a manual input to input device 470. For example, the passenger 190 may respond to a prompt on the display device 480 by entering a manual input via the input device 470. In one example, the manual input may be a touch on the touchscreen or a voice command into the microphone. In an embodiment, the display device 480 and the input device 470 may be combined into a single device, such as, for example, a touchscreen. There may be more than one input devices 470, such as, for example, a touchscreen, a microphone, and/or a physical button.

The passenger mobile device 400 device may also include a feedback device 460. The feedback device 460 may activate in response to a manual input via the input device 470. The feedback device 460 may be a haptic feedback vibration device and/or a speaker emitting a sound. The feedback device 460 device may activate to confirm that the manual input entered via the input device 470 was received via the elevator call application 450. For example, the feedback device 460 device may activate by emitting an audible sound or vibrate the passenger mobile device 400 to confirm that the manual input entered via the input device 470 was received via the elevator call application 450.

The passenger 190 may enter the elevator call 380 using a keypad, physical button, or touchscreen of the passenger mobile device 400. The display device 480 may also act as a touch screen. The passenger 190 may also enter the elevator call 380 via a voice command that is received by a microphone of the passenger mobile device 400.

The controller 115 is configured to control and coordinate operation of an elevator system 101. The controller 115 may be an electronic controller including a processor 152 and an associated memory 154 comprising computer-executable instructions that, when executed by the processor 152, cause the processor 152 to perform various operations. The processor 152 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 154 may be but is not limited to a random access memory (RAM), read only memory (ROM), or other electronic, optical, magnetic or any other computer readable medium.

The dispatcher 350 is configured to control and coordinate operation of one or more elevator systems 101 in one or more elevator banks 112. The dispatcher 350 may be an electronic controller including a processor 352 and an associated memory 354 comprising computer-executable instructions that, when executed by the processor 352, cause the processor 352 to perform various operations. The processor 352 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 354 may be but is not limited to a random access memory (RAM), read only memory (ROM), or other electronic, optical, magnetic or any other computer readable medium.

The controller 115 can be local, remote, cloud, etc. The dispatcher 350 may be local, remote, cloud, etc. The dispatcher 350 is in communication with the controller 115 of each elevator system 101. The dispatcher 350 may be a 'group' software that is configured to control the elevator system 101.

The dispatcher 350 is in communication with the elevator call device 89 of the building elevator system 100. The dispatcher 350 is configured to receive the elevator call 380 transmitted from the elevator call device 89, beacon 250, and/or the passenger mobile device 400. The dispatcher 350 is configured to manage the elevators calls 380 coming in from the elevator call device 89, beacon 250, and/or the passenger mobile device 400 then command one or more elevator systems 101 to respond to elevator call 380.

The beacon 250 may be configured to emit a wireless signal 290 (i.e., advertisement) from a communication device 280 using short-range wireless protocols. Short-range wireless protocols may include, but not are limited to, Bluetooth, BLE, Wi-Fi, HaLow (801.11ah), zWave, ZigBee, Wireless M-Bus ultra-wideband, Wireless M-Bus, or any other short-range wireless protocol known to one of skill in the art. In an embodiment, the wireless signal 290 is a Bluetooth wireless signal. The wireless signal 290 may be emitted from the communication device 280 at a selected frequency within a selected range R1 of the beacon 250. The wireless signal 290 is detected by the passenger mobile device 400 once the passenger mobile device 400 is within the selected range of the beacon 250.

Before, during and/or after the transmission of an elevator call 380 from the passenger mobile device 400, the elevator call application 450 may command the communication device 440 to search for the wireless signal 290 of the beacon 250 that is nearest to the passenger mobile device 400 in order to identify what elevator bank 112 the passenger 190 will be using and what landing 125 the passenger 190 will be departing from. Once the passenger mobile device 400 detects the advertisement 290 then the elevator call application 450 may utilize the location information 390 and/or the received signal strength indicator (RSSI) of the wireless signal.

The elevator call application 450 may request and receive location information 390 from the beacon 250 identifying what landing 125 (i.e., floor) the beacon 250 is located on and what elevator bank 112 the beacon 250 is located near or what elevator bank 112 the beacon 250 belongs to. For example, the beacon 250 may be located at the front door of a building 102 and belong to an elevator bank 112 on the first floor/landing 125 on the other side of the building 102.

The beacon 250 may be configured to transmit the location information 390 of the beacon 250 to the passenger mobile device 400 and then the passenger mobile device 400 is configured to transmit the location information 390 to the dispatcher 350. Alternatively, the beacon 250 may be configured to receive identifier information 382 from the passenger mobile device 400 and transmit the location information 390 of the beacon 250 and the identifier information 382 to the dispatcher 350.

There may be a beacon 250 located at or proximate the elevator bank 112. It is understood that while FIG. 2 illustrates a single beacon 250 located proximate the elevator bank 112, the embodiments described herein are applicable to one or more beacons 250 located anywhere inside or outside the building 102. For example, the beacons 250 may be located in a parking garage, parking lot, a lobby, a door, a hallway, a meeting room, a cafeteria, or any other possible location inside or outside of the building.

A beacon 250 may be located at the elevator bank 112 to confirm when the passenger 190 is proximate the elevator bank 112, which may confirm that the individual intends to use the elevator system 101.

The beacon 250 includes a processor 252 and an associated memory 254 including computer-executable instructions that, when executed by the processor 252, cause the processor 252 to perform various operations. The processor 252 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be a storage device such as, for example, a random access memory (RAM), read only memory (ROM), or other electronic, optical, magnetic or any other computer readable medium.

The beacon 250 includes a communication device 280 configured to allow the beacon 250 emit the wireless signal 290. The beacon may also be capable of communicating with the dispatcher 350. The communication device 280 is capable of transmitting and receiving data to and from the dispatcher 350 through a computer network 232. The computer network 232 may be a cloud computing network or the internet. In another embodiment, the communication device 280 is capable of transmitting and receiving data to and from the dispatcher 350 by communicating directly with the dispatcher 350.

The communication device 280 may be connected to the dispatcher 350 through a wired connection. The communication device 280 may be connected to the call device 89 through a wired connection, and then the call device 89 may be connected to the dispatcher 350 through a wired connection.

The communication device 280 may alternatively communicate to the computer network 232 through a wireless access protocol device (WAP) 234 using short-range wireless protocols. Short-range wireless protocols may include, but not are limited to, Bluetooth, Wi-Fi, HaLow (801.11ah), zWave, ZigBee, ultra-wideband, Wireless M-Bus, or any other short-range wireless protocol known to one of skill in the art. Alternatively, the communication device 280 may communicate directly with the computer network 232 using long-range wireless protocols. Long-range wireless protocols may include, but are not limited to, cellular, LTE (NB-IoT, CAT MI), LoRa, satellite, Ingenu, or SigFox.

The communication device 280 may communicate to the dispatcher 350 through a WAP 234 using short-range wireless protocols. Alternatively, the communication device 280 may communicate directly with the dispatcher 350 using short-range wireless protocols.

The communication device 280 is configured to communicate with the passenger mobile device 400 using short-range wireless protocols. The communication device 280 may also be configured communicate with the passenger mobile device 400 through the WAP 234 or any other desired short-range wireless protocol.

Figure 3:
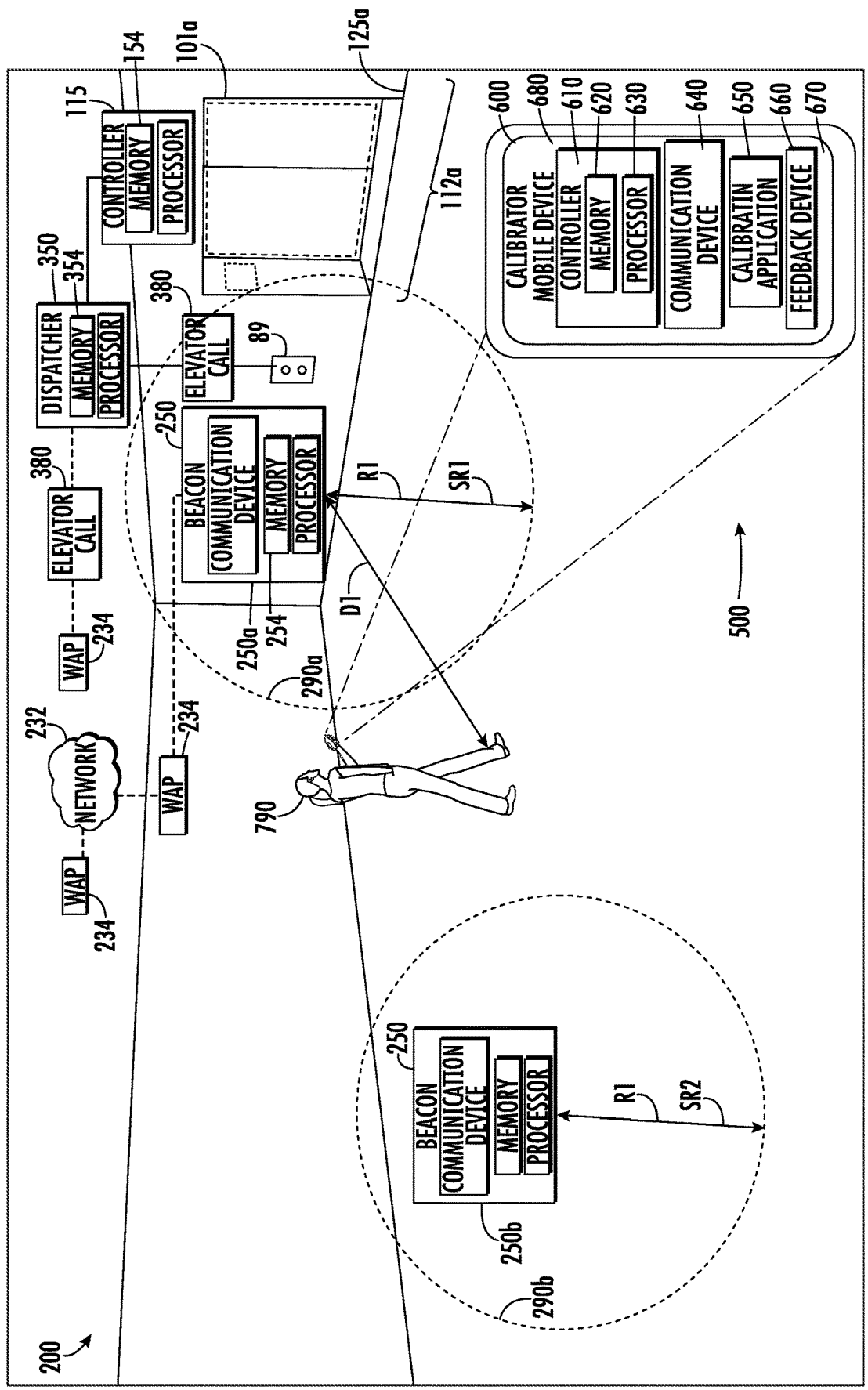
FIG. 3 illustrates a beacon calibration system for calibration of the beacon on FIG. 2, in accordance with an embodiment of the disclosure.

Referring now to FIG. 3, with continued reference to FIGS. 1-2, a beacon calibration system 500 for the elevator call system 200 is illustrated, in accordance with an embodiment of the present disclosure. It should be appreciated that, although particular systems are separately defined in the schematic block diagrams, each or any of the systems may be otherwise combined or separated via hardware and/or software. The beacon calibration system 500 is illustrated with two beacons 250 including a first beacon 250a and a second beacon 250b but it is understood that that the beacon calibration system 500 may work with any number of beacons 250.

In FIG. 3 and the associated description, the first beacon 250a is being calibrated or recalibrated by the calibrator 790 who is attempting to prevent overlap or control an amount of overlap between the first wireless signal 290a of the first beacon 250a and the second wireless signal 290b (i.e., wireless signal) of the second beacon 250b. The beacon calibration system 500 may be utilized upon initial installation of the elevator call system 200 and initial calibration of the beacons 250 or upon recalibration of one or more beacons 250, where each may be referred to as a calibration of the one or more beacons 250 herein. The first beacon 250a may be associated with one or more specific elevator systems 101a at a specific elevator bank 112a on a specific landing 125a. The association of the first beacon 250 with the one or more specific elevator systems 101a at the specific elevator bank 112a on the specific landing 125a may be established by the calibrator 790 through a calibration application 650. The association of the first beacon 250 with the one or more specific elevator systems 101a at the specific elevator bank 112a on the specific landing 125a may be saved in the calibration application 650, the memory 254 of the first beacon 250, the memory 154, of the controller 115, the memory 354 of the dispatcher 350, and/or the network 232. The association of the first beacon 250 with the one or more specific elevator systems 101a at the specific elevator bank 112a on the specific landing 125a may be referred to as the location information 390 of FIG. 2

The beacon calibration system 500 may include the components of the elevator call system 200 and the calibration application 650 operated through a calibrator mobile device 600. The calibration application 650 may be installed on the calibrator mobile device 600 or accessed via the network 232 through the calibrator mobile device 600, such as, for example a software-as-a service.

The calibrator mobile device 600 may be a similar mobile computing device as the passenger mobile device 400. The calibrator mobile device 600 may be the same mobile computing device as the passenger mobile device 400 and the calibrator 790 may also be the passenger 190. Alternatively, the calibrator mobile device 600 may be a different mobile computing device than the passenger mobile device 400 and the calibrator 790 may be a different person than the passenger 190.

The calibrator mobile device 600 may be a mobile computing device that is typically carried by a person, such as, for example a phone, a smart phone, a PDA, a smart watch, a tablet, a laptop, or any other mobile computing device known to one of skill in the art. In an embodiment, the calibrator mobile device 600 is a smart phone.

The calibrator mobile device 600 includes a controller 610 configured to control operations of the calibrator mobile device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The calibrator mobile device 600 includes a communication device 640 configured to communicate with the WAP 234 or the beacon 250 through one or more wireless signals. The one or more wireless signals may include Bluetooth, BLE, Wi-Fi, HaLow (801.11ah), zWave, ZigBee, ultra-wideband, Wireless M-Bus, or any other short-range wireless protocol known to one of skill in the art.

The calibrator mobile device 600 may include a display device 680, such as for example a computer display, an LCD display, an LED display, an OLED display, a touchscreen of a smart phone, or any other similar display device known to one of the skill in the art. The calibrator 790 operating the calibrator mobile device 600 is able to view the calibration application 650 through the display device 680.

The calibrator mobile device 600 includes an input device 670 configured to receive a manual input from the calibrator 790 (e.g., human being) of mobile device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the calibrator mobile device 600, or any similar input device known to one of skill in the art. The calibrator 790 operating the calibrator mobile device 600 is able to enter feedback into the calibration application 650 through the input device 670. The input device 670 allows the calibrator 790 operating the calibrator mobile device 600 to enter feedback into the calibration application 650 via a manual input to input device 670. For example, the calibrator 790 may respond to a prompt on the display device 680 by entering a manual input via the input device 670. In one example, the manual input may be a touch on the touchscreen or a voice command into the microphone. In an embodiment, the display device 680 and the input device 670 may be combined into a single device, such as, for example, a touchscreen. There may be more than one input devices 670, such as, for example, a touchscreen, a microphone, and/or a physical button.

The calibrator mobile device 600 device may also include a feedback device 660. The feedback device 660 may activate in response to a manual input via the input device

670. The feedback device 660 may be a haptic feedback vibration device and/or a speaker emitting a sound. The feedback device 660 device may activate to confirm that the manual input entered via the input device 670 was received via the calibration application 650. For example, the feedback device 660 device may activate by emitting an audible sound or vibrate the calibrator mobile device 600 to confirm that the manual input entered via the input device 670 was received via the calibration application 650.

The calibration application 650 on the calibrator mobile device 600 may generate an alert to be displayed on the display device 680 when the wireless signal 290 of the beacon 250 is detected. The beacon 250 may be detected by the communication device 630 of the calibrator mobile device 600.

During a calibration process of the elevator call system 200, the selected range R1 of each beacon 250 needs to be established. Advantageously, by establishing a selected range R1 that is appropriate for a beacon 250 it will ensure that the "territory" desired for the beacon 250 is properly established so that any elevator call 380 made from a passenger mobile device 400 within the selected range R1 of the beacon 250 will be identified with that beacon 250. To avoid confusion with other beacons 250, it is important that the selected range R1 for a beacon 250 does not bleed into the selected range R1 of another beacon or if the selected range R1 does bleed into the selected range R1 of another beacon 250 it does so minimally. This includes minimizing the bleeding of a beacon 250 on a landing 125 into different landings 125 where the beacon 250 is not located.

For example, the first selected range SR1 of the first beacon 250a needs to be established so that it does not overlap with the second selected range SR2 of the second beacon 250. Advantageously, by establishing the first selected range SR1 that is appropriate for the first beacon 250a it will ensure that the "territory" desired for the first beacon 250a is properly established so that any elevator call 380 made from a passenger mobile device 400 within the first selected range SR1 of the first beacon 250a will be identified with the first beacon 250a.

In order to establish, the first select range SR1 of the first beacon 250 a calibration process may be imitated through a calibration application 650 of a calibrator mobile device 600. The calibration process may be initiated automatically by the calibration application 650 or manually by the calibrator 790. For example, the calibration application 650 may instruct the calibrator 790 to stand with the calibrator mobile device 600 at a desired distance D1 away from the first beacon 250a at a particular time. The desired distance D1 may be how far the calibrator 790 wants the first wireless signal 290a of the first beacon 250a to reach. The calibration application 650 may ask, through a visual command on the display device 680 or an audible command through the feedback device 660, the calibrator 790 to confirm that they are at the desired distance D1 away from the first beacon 250 using a manual input to the input device 670. For example, the manual input may be a tap on the touch screen, a shake of the calibrator mobile device 600, or voice confirmation.

The calibration application 650 may be configured to automatically establish the desired distance D1 as the first selected range SR1. Alternatively, the calibrator 790 may establish the desired distance D1 as the first selected range SR1 through a manual input to the input device 670. The calibration application 650 is configured to automatically establish the desired distance D1 as the first selected range SR1 by adjusting a power of the first wireless signal 290a so that the first wireless signal 290 does not travel beyond the desired distance or will be undetectable beyond the first desired distance D1. Alternatively, the calibration application 650 is configured to automatically establish the desired distance D1 as the first selected range SR1 by identifying the RSSI detected by the communication device 640 at the desired distance D1 as being the minimum RSSI for the first beacon 250a and any RSSI of the first beacon 250a detected below the minimum RSSI will be ignore by the calibration application 650. Alternatively, the calibration application 650 is configured to automatically establish the desired distance D1 as the first selected range SR1 by adjusting a power of the first wireless signal 290a and identifying the RSSI detected by the communication device 640 at the desired distance D1 as being the minimum RSSI for the first beacon 250a.

Figure 4:
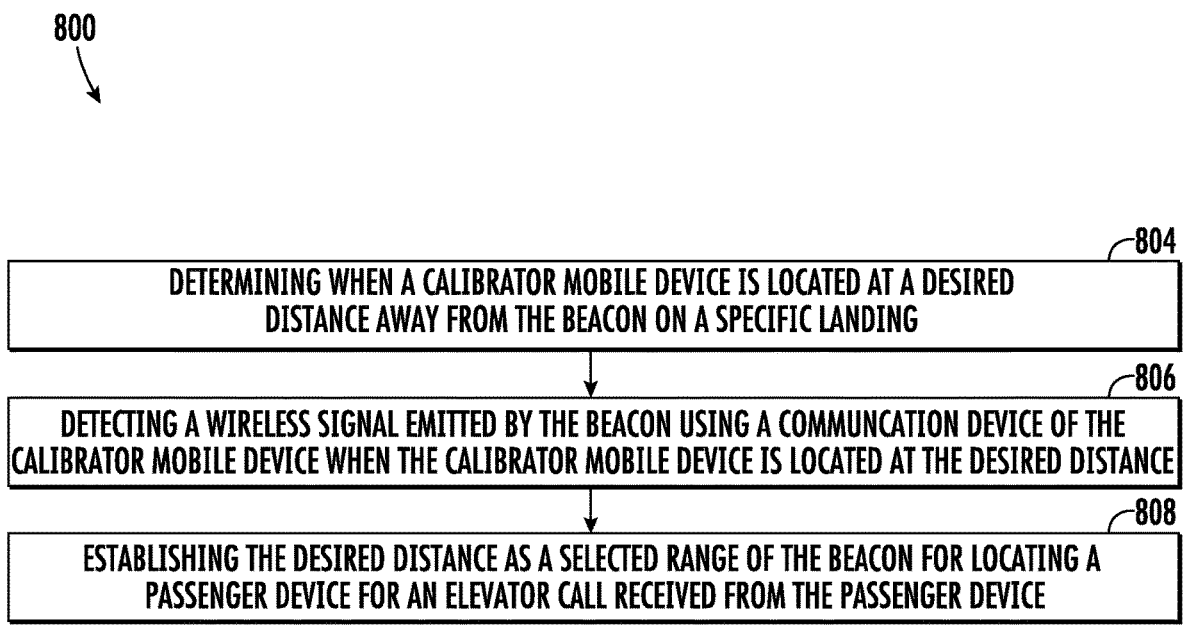
FIG. 4 is a flow chart of method of calibrating the beacon of the elevator call system of FIGS. 1-3, in accordance with an embodiment of the disclosure.

Referring now to FIG. 4, while referencing components of FIGS. 1-3. FIG. 4 shows a flow chart of method 800 of calibrating a beacon 250 for an elevator call system 200, in accordance with an embodiment of the disclosure. In an embodiment, the method 800 is performed by the beacon calibration system 500 of FIG. 2. In an embodiment, the method 800 is performed by the calibration application 650 of FIG. 3.

At block 804, it is determined when a calibrator mobile device 600 is located at a desired distance D1 away from the beacon 250 on a specific landing 125a. The beacon 250 being associated with one or more specific elevator systems 101a at a specific elevator bank 112a on the specific landing 125a.

At block 806, a wireless signal emitted by the beacon 250 is detected using a communication device 640 of the calibrator mobile device 600 when the calibrator mobile device 600 is located at the desired distance D1.

At block 808, the desired distance is established as the selected range R1 of the beacon 250 for locating a passenger device 400 for an elevator call 380 received from the passenger device 400. An elevator call system 200 is configured to assign future elevator calls received from the passenger mobile device 400 detected to be within the selected range R1 of the beacon 250 to the one or more specific elevator systems 101a at the specific elevator bank 112a on the specific landing 125a.

The desired distance D1 may be established as the selected range R1 of the beacon 250 for locating the passenger device 400 for the elevator call 380 received from the passenger device 400 by adjusting a power of the wireless signal emitted 290 by the beacon 250 such that the wireless signal 290 is configured to not travel beyond the desired distance D1 or the wireless signal 290 will be undetectable beyond the desired distance D1.

The desired distance D1 may be established as the selected range R1 of the beacon 250 for locating the passenger device 400 for the elevator call 380 received from the passenger device 400 by detecting, using a communication device 640 of the calibrator mobile device 600, a RSSI of the wireless signal 290 emitted by the beacon 250. Then it may be established that the RSSI detected by the communication device 640 at the desired distance D1 as being a minimum RSSI for the beacon 250 and any future RSSI from the beacon 250 that is detected to be less than the minimum RSSI is to be ignored when assigning future elevator calls 380.

The method 800 may further include that the beacon 250 is associated with the one or more specific elevator systems 101a at the specific elevator bank 112a on the specific landing 125a.

Prior to block 804, the method 800 may include that a calibrator 790 is instructed to place the calibrator mobile device 600 with the calibration application 650 at the desired distance D1 away from the beacon 250. The calibrator 790 may be instructed via a message display on a display device 680 of the calibrator mobile device 600 or through a message audibly emitted through a feedback device 660 of the calibrator mobile device 600.

The method 800 may also include that the calibrator 790 places the calibrator mobile device 600 at the desired distance D1 away from the beacon 250 on the specific landing 125a. The calibrator 790 may place the calibrator mobile device 600 at the desired distance D1 away from the beacon 250 on the specific landing 125a prior to block 804.

Once the beacon 250 is calibrated, the method 800 may further include a testing phase or a passenger use phase including the following steps. An elevator call 380 is transmitted from an elevator call application 450 on the passenger mobile device 400, the wireless signal 290 emitted by the beacon 250 using a communication device 440 of the passenger mobile device 400, and then the elevator call 380 is assigned to the one or more specific elevator systems 101a. The method 800 may then move an elevator car 103 of the one or more specific elevator systems 101 at the specific elevator bank 112a to the specific landing 125a to pick-up a passenger 190 in possession of the passenger mobile device 400.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of calibrating a beacon for an elevator call system, the method comprising:
   determining when a calibrator mobile device is located at a desired distance away from the beacon on a specific landing, the beacon being associated with one or more specific elevator systems at a specific elevator bank on the specific landing;
   detecting a wireless signal emitted by the beacon using a communication device of the calibrator mobile device when the calibrator mobile device is located at the desired distance; and
   establishing the desired distance as a selected range of the beacon for locating a passenger device for an elevator call received from the passenger device,
   wherein the elevator call system is configured to assign future elevator calls received from the passenger mobile device detected to be within the selected range of the beacon to the one or more specific elevator systems at the specific elevator bank on the specific landing.

2. The method of claim 1, wherein prior to determining when the calibrator mobile device is located at the desired distance away from the beacon on the specific landing, the method further comprise:
   instructing a calibrator to place the calibrator mobile device at the desired distance away from the beacon.

3. The method of claim 1, wherein the establishing the desired distance as the selected range of the beacon for locating the passenger device for the elevator call received from the passenger device further comprises:
   adjusting a power of the wireless signal emitted by the beacon such that:
      the wireless signal is configured to not travel beyond the desired distance: or
      the wireless signal will be undetectable beyond the desired distance.

4. The method of claim 1, wherein the establishing the desired distance as the selected range of the beacon for locating the passenger device for the elevator call received from the passenger device further comprises:
   detecting, using the communication device of the calibrator mobile device, a received signal strength indicator of the wireless signal emitted by the beacon; and
   establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

5. The method of claim 1, further comprising:
transmitting an elevator call from an elevator call application on the passenger mobile device;
detecting the wireless signal emitted by the beacon using a communication device of the passenger mobile device; and
assigning the elevator call to the one or more specific elevator systems.

6. The method of claim 5, further comprising:
moving an elevator car of the one or more specific elevator systems at the specific elevator bank to the specific landing to pick-up a passenger in possession of the passenger mobile device.

7. The method of claim 1, further comprising:
placing the calibrator mobile device at the desired distance away from the beacon on the specific landing.

8. A beacon calibration system for calibrating a beacon of an elevator call system, the beacon calibration system comprising:
a processor; and
a memory comprising computer-executable instructions that, when executed by the processor, cause the processor to perform operations, the operations comprising:
determining when a calibrator mobile device is located at a desired distance away from the beacon on a specific landing, the beacon being associated with one or more specific elevator systems at a specific elevator bank on the specific landing;
detecting a wireless signal emitted by the beacon using a communication device of the calibrator mobile device when the calibrator mobile device is located at the desired distance; and
establishing the desired distance as a selected range of the beacon for locating a passenger device for an elevator call received from the passenger device,
wherein an elevator call system is configured to assign future elevator calls received from the passenger mobile device detected to be within the selected range of the beacon to the one or more specific elevator systems at the specific elevator bank on the specific landing.

9. The beacon calibration system of claim 8, wherein prior to determining when the calibrator mobile device is located at the desired distance away from the beacon on the specific landing, the operations further comprise:
instructing a calibrator to place the calibrator mobile device at the desired distance away from the beacon.

10. The beacon calibration system of claim 8, wherein the establishing the desired distance as the selected range of the beacon for locating the passenger device for the elevator call received from the passenger device further comprises:
adjusting a power of the wireless signal emitted by the beacon such that:
the wireless signal is configured to not travel beyond the desired distance: or
the wireless signal will be undetectable beyond the desired distance.

11. The beacon calibration system of claim 8, wherein the establishing the desired distance as the selected range of the beacon for locating the passenger device for the elevator call received from the passenger device further comprises:
detecting, using the communication device of the calibrator mobile device, a received signal strength indicator of the wireless signal emitted by the beacon; and
establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

12. The beacon calibration system of claim 8, wherein the operations further comprise:
transmitting an elevator call from an elevator call application on the passenger mobile device;
detecting the wireless signal emitted by the beacon using a communication device of the passenger mobile device; and
assigning the elevator call to the one or more specific elevator systems.

13. The beacon calibration system of claim 12, wherein the operations further comprise:
moving an elevator car of the one or more specific elevator systems at the specific elevator bank to the specific landing to pick-up a passenger in possession of the passenger mobile device.

14. A computer program product embodied on a non-transitory computer readable medium, the computer program product including instructions that, when executed by a processor, cause the processor to perform operations comprising:
determining when a calibrator mobile device is located at a desired distance away from a beacon on a specific landing, the beacon being associated with one or more specific elevator systems at a specific elevator bank on the specific landing;
detecting a wireless signal emitted by the beacon using a communication device of the calibrator mobile device when the calibrator mobile device is located at the desired distance; and
establishing the desired distance as a selected range of the beacon for locating a passenger device for an elevator call received from the passenger device,
wherein an elevator call system is configured to assign future elevator calls received from the passenger mobile device detected to be within the selected range of the beacon to the one or more specific elevator systems at the specific elevator bank on the specific landing.

15. The computer program product of claim 14, wherein prior to determining when the calibrator mobile device is located at the desired distance away from the beacon on the specific landing, the operations further comprise:
instructing a calibrator to place the calibrator mobile device at the desired distance away from the beacon.

16. The computer program product of claim 14, wherein the establishing the desired distance as the selected range of the beacon for locating the passenger device for the elevator call received from the passenger device further comprises:
adjusting a power of the wireless signal emitted by the beacon such that:
the wireless signal is configured to not travel beyond the desired distance; or
the wireless signal will be undetectable beyond the desired distance.

17. The computer program product of claim 14, wherein the establishing the desired distance as the selected range of the beacon for locating the passenger device for the elevator call received from the passenger device further comprises:

detecting, using the communication device of the calibrator mobile device, a received signal strength indicator of the wireless signal emitted by the beacon; and establishing that the received signal strength indicator detected by the communication device at the desired distance as being a minimum received signal strength indicator for the beacon and any future received signal strength indicator from the beacon that is detected to be less than the minimum received signal strength indicator is to be ignored when assigning future elevator calls.

18. The computer program product of claim 14, wherein the operations further comprise:

transmitting an elevator call from an elevator call application on the passenger mobile device;

detecting the wireless signal emitted by the beacon using a communication device of the passenger mobile device; and assigning the elevator call to the one or more specific elevator systems.

19. The computer program product of claim 18, wherein the operations further comprise:

moving an elevator car of the one or more specific elevator systems at the specific elevator bank to the specific landing to pick-up a passenger in possession of the passenger mobile device.

* * * * *